Patented Sept. 25, 1923.

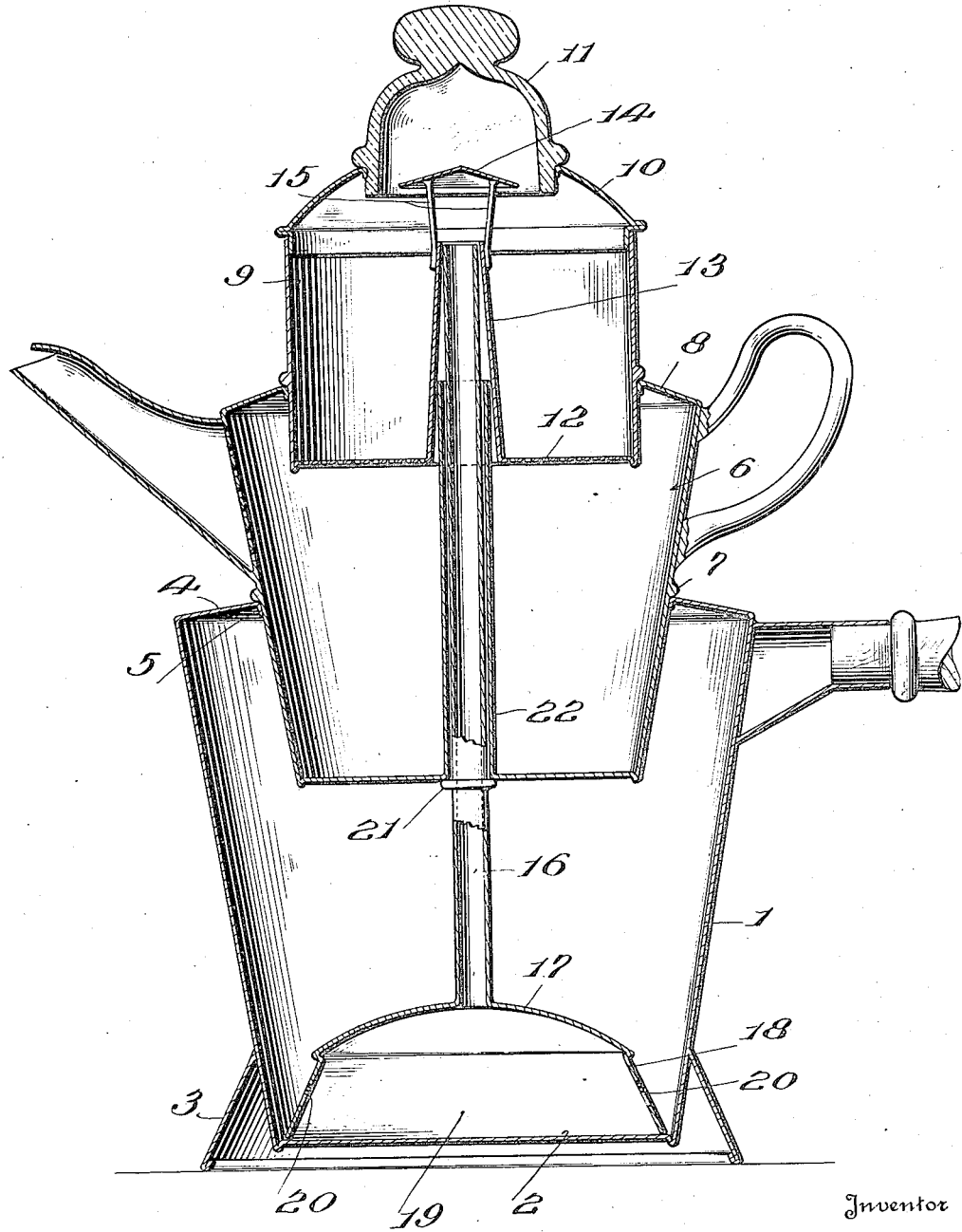

1,469,139

UNITED STATES PATENT OFFICE.

DOMENICK ACQUAVIVA, OF NEW YORK, N. Y.

PERCOLATOR.

Application filed March 22, 1922. Serial No. 545,904.

*To all whom it may concern:*

Be it known that I, DOMENICK ACQUAVIVA, a subject of the King of Italy, residing at New York city, in the county of New York and State of New York, U. S. A., have invented certain new and useful Improvements in Percolators, of which the following is a specification.

This invention relates to percolators, and more particularly stated, contemplates the production of a combined boiler and coffee pot wherein the water is transferred from said boiler and allowed to pass only once through the coffee, the beverage being maintained in said coffee pot sufficiently removed from the heating medium to prevent undue evaporation.

It is customary in the use of percolators to compute the capacity thereof in cups or similar measurements, the required quantity of water being introduced and allowed to percolate many times through the comminuted coffee. During the percolating of the beverage considerable evaporation takes place, and if when the coffee reaches its desired strength the heat is not removed therefrom, a continuous and rapid evaporation takes place thereby greatly reducing the quantity.

The present invention has for it primary object the provision of means for transferring a predetermined quantity of water from the boiler to the coffee pot, and when such transfer has been made, to prevent the further elevation of water to the coffee pot.

The invention has for a further object the provision of water conducting means including a tube, said tube extending upwardly from a dome and a continuous annular flange, the latter having an opening and forming with the bottom of the boiler a chamber from which the water is projected upwardly into the coffee pot.

A still further object of the invention is to provide a boiler of predetermined capacity and coffee percolator elements, and means for permitting the elevation of the water, whereby upon the percolation of a predetermined quantity, further percolation thereof will be impossible.

With these and other objects in view the invention further consists in the comparatively simple construction of the several parts which can be inexpensively manufactured and easily cleansed.

In the drawing, chosen for purposes of illustrating my invention, the boiler 1 is shown of frusto-conical contour having a bottom 2, and an outwardly extending annular flange 3, the latter serving to confine the heat around the lowermost portion of the boiler. An inwardly extending flange 4 is provided at the top of the boiler, the inner edges 5 of said flange constituting a seat into which fits the coffee pot 6. A bead 7 is provided on said coffee pot and extends over a portion of the flange 4 as shown. This construction provides for a relative tight fit or sealing when the coffee pot is placed in position within the boiler.

The coffee pot 6 is of frusto-conical shape, the upper annular flange 8 forming a support for the coffee container 9 as shown. The cover section 10 of said container fits within the upper end thereof, and a glass cap 11 may be connected to said cover section 10 as shown.

The coffee container 9 is provided with the usual sieve or screen 12, said sieve comprising the perforated bottom wall of the container. A tube 13 projects upwardly and centrally of the sieve 12, and has spaced from its upper end the distributor 14. Wires or other suitable devices 15 serve to support the distributor a sufficient distance above the tube 13 to permit the percolated water to properly spread upon the comminuted coffee in the container. The tube 13 is tapered, the upper end thereof being restricted to substantially engage the upper end of the water conducting tube 16 now to be described.

The means for conducting the percolating water from the boiler to the container 9 and thence to the coffee pot, comprises the tube 16 projecting upwardly from the dome 17, the latter having formed contiguous therewith the inverted frusto-conical flange 18. The lowermost edge of the flange 18 engages the bottom wall 2 of the boiler in close proximity to the side walls thereof. A chamber 19 is formed between the bottom wall 2 of the boiler and the inverted frusto-conical dome section, openings 20 being provided in the walls of the flange 18 and adapted to establish communication between the said chamber 19 and the interior of the boiler. These openings 20 are shown as diametrically located, and are of a predetermined size so as to permit the flow and forcing of the water upwardly through the tube 16 during the percolating action.

The tube 16 is provided with a flange or collar 21 against which the bottom of the coffee pot 6 contacts. This collar in addition to supporting the coffee pot, also serves to prevent the escape of steam or vapor generated during the heating of the water within the boiler. The immediate portion of the coffee pot 6 resting upon the collar 21 includes the centrally located tube portion 22. The tube 22 surrounds the water tube 16 and extends well up into the conical tube 13 provided in the coffee container. The upper end of the tube 22 closely fits the interior walls of the tube 13.

In the use of my invention the boiler 1 is filled to a capacity in excess of the quantity of coffee which it is desired to make. The proper amount of comminuted coffee is deposited in the container 9 and the heating medium arranged beneath the bottom wall 2 of the boiler. Upon the developing of the proper pressure within the boiler 1 the water is elevated through the tube 16 and allowed to percolate through the comminuted coffee. This operation continues as long as the pressure within the boiler is sufficient to provide for the elevation of the water from the chamber 19 upwardly through the water tube, the openings 20 in the flange 18 serving to provide for the proper flow of the water from the boiler 1 into said chamber 19. The quantity of water transferred from the boiler 1 is that predetermined quantity of coffee which it is desired to make according to the height to which the boiler is filled, and when this amount has been transferred the quantity of water left within the boiler 1 and its relative height with respect to the entrance of the tube 16 is incapable of being further elevated through the water tube 16, except it be by evaporation. The evaporation however is insufficient to increase the quantity of the percolated coffee, and as a consequence the exact amount of coffee desired and the strength thereof remains unchanged.

When the predetermined quantity of water has been forced up through the tube 16 until the level of the water sinks below the upper part of the dome 17, the water will no longer be forced up through said tube into the coffee pot. The water within the chamber 19 and that water left within the boiler 1 may be further subjected to the heat, but it will be obvious that the contents of the coffee pot will be unaffected by this continued heating of the water in the boiler. It will also be seen that the evaporation of the coffee from the pot 6 will be negligible as the coffee will not be directly affected by the heating medium.

The quantity of water remaining in the comparatively small annular chamber formed between the side walls of the boiler and the flange 18 of the dome section, may continue to boil. The height of the water in the small annular chamber of the boiler and the dome section reaches an ineffective low level after the predetermined quantity of water has been transferred to the coffee pot. Pressure sufficient to elevate the water through the tube 16 cannot be obtained, and the percolated coffee already obtained remains undisturbed. The relative height of the dome section from the bottom of the boiler, and the height of the communicating opening between the chamber 19 and the water tube may be varied.

The exact shape and capacity of the boiler and coffee pot, together with the water tube and dome section forming the lower chamber 19 and the communicating openings therein, may be varied, and I do not limit myself to the exact construction herein disclosed.

I claim:

1. A device of the class described comprising a boiler, a coffee pot supported by the boiler and having a portion adapted to extend into said boiler and form a closure therefor, a container for comminuted coffee provided in said coffee pot, a distributor, and means for further supporting said coffee pot, said means acting to prevent the escape of steam or vapor from the boiler at said last named point of support, means for effecting the delivery of the heated water in the boiler to the coffee pot, said means including a member having a top portion, an upright tube extending therefrom, an annular flange depending from said top portion and arranged to provide a chamber adjacent the side wall of the boiler at the bottom thereof, said flange being provided with oppositely disposed openings for establishing communication between the said chamber at the bottom of the boiler and the interior of the said member whereby a predetermined quantity of the water can only be transferred to the coffee pot.

2. A device of the class described comprising a boiler, a coffee pot adapted to extend into said boiler and prevent the escape of steam therefrom, a container for comminuted coffee provided in said coffee pot, a distributor, and means for effecting the delivery of the heated water to the coffee pot, said means including a hollow section provided with a portion forming a relatively large chamber between the top portion and the bottom of the boiler, said depending annular wall serving to form another chamber adjacent the bottom of said boiler, and having an opening therein adapted to establish communication between the boiler and said chamber, and means provided on said tube for supporting the coffee pot, said means also acting to prevent the escape of steam or vapor from the boiler, a tube extending from the top portion of said section to said container, said tube being in communication with said chamber above the opening provided in said section.

3. A device of the class described comprising a boiler, a coffee pot mounted therein, a container for comminuted coffee, a distributor, a water tube and associated chamber forming dome for conveying the water from the boiler to said coffee pot, and means for supporting said coffee pot upon said tube, said means also acting to prevent the escape of steam or vapor from the boiler at the said point of support.

4. A device of the class described involving a frusto-conical boiler having an annular flange provided with a seat, a frusto-conical coffee pot supported in said seat, a central tube provided on said coffee pot, a water tube extending into said first named tube, and means provided on said water tube for supporting the coffee pot, said means including a flange adapted to prevent the escape of steam or vapor from the boiler, an inverted frusto-conical dome communicating with said water tube and provided with an opening for establishing communication between the boiler and a chamber beneath the said inverted frusto-conical dome.

5. A device of the class described comprising a boiler, a coffee pot mounted in said boiler, a container for comminuted coffee, a distributor, a water tube for transferring a predetermined quantity of water from said boiler to the coffee pot, said tube having a portion adapted to prevent the escape of steam from said boiler, and a dome section communicating with said water tube and provided with an opening for establishing communication between the boiler and a chamber formed beneath the said dome section.

6. A device of the class described comprising a boiler, a pot mounted in said boiler, a container for comminuted material, distributor means, a water tube for effecting the transfer of a quantity of liquid from said boiler to said pot, and means for supporting said pot, said means acting to prevent escape of steam from the boiler, a dome section adapted to form a relatively large chamber adjacent the bottom wall of the boiler and a comparatively small annular chamber portion surrounding said large chamber, said dome section having openings for establishing communication between the boiler and said chamber formed between the bottom of the tube and the dome section.

7. A device of the class described comprising a boiler, a coffee pot having a portion extending into said boiler adapted to prevent the escape of steam therefrom, a container for comminuted coffee, a distributor means, a water tube for effecting the transfer of a quantity of water from the boiler to said coffee pot, a hollow section having a portion adapted to form a relatively large chamber between the top of said section and the bottom of the boiler, said section also having a portion arranged at an angle to the wall of said boiler for forming another chamber surrounding said large chamber, and means for supporting the coffee pot, said means including a flange formed on the water tube and adapted to prevent the escape of steam and vapor from the boiler, means including two oppositely arranged openings in said section, said openings being arranged intermediate the bottom and top of the section for establishing communication between the aforesaid chambers.

In testimony whereof I affix my signature.

DOMENICK ACQUAVIVA.